US005677577A

United States Patent [19]

Barbehenn et al.

[11] Patent Number: 5,677,577

[45] Date of Patent: Oct. 14, 1997

[54] REDUCING ENERGY VARIATIONS IN THERMAL INKJET PRINTERS

[75] Inventors: George Barbehenn; John Eaton, both of Vancouver, Wash.

[73] Assignee: Hewlett-Packard Company, Palo Alto, Calif.

[21] Appl. No.: 708,172

[22] Filed: Aug. 8, 1996

Related U.S. Application Data

[63] Continuation of Ser. No. 311,372, Sep. 23, 1994, abandoned.

[51] Int. Cl.[6] .......... G01D 15/00

[52] U.S. Cl. .......... 307/98; 347/190; 400/120.09

[58] Field of Search .......... 307/98, 99; 347/171, 347/188, 190–192, 196, 184, 9, 12, 19, 57; 400/120.1, 120.09; 219/486, 216, 485

[56] References Cited

U.S. PATENT DOCUMENTS

| | | | |
|---|---|---|---|
| 4,219,824 | 8/1980 | Asai | 347/190 |
| 4,389,935 | 6/1983 | Arai | 347/190 |
| 4,510,505 | 4/1985 | Fukui | 347/192 |
| 5,087,923 | 2/1992 | Bruch | 347/184 |
| 5,109,235 | 4/1992 | Sasaki | 347/196 |

FOREIGN PATENT DOCUMENTS 0318328 11/1988 European Pat. Off. .

OTHER PUBLICATIONS

J. Harmon, "Integrating the Printhead Into the HP Deskjet Printer," Oct. 1988, H–P Journal, pp. 62 ff.

*Primary Examiner*—Richard T. Elms

[57] ABSTRACT

In thermal inkjet printing, an energy source supplies voltage pulses to a set of resistors in a printhead. The resistors are not necessarily equal-valued. The subset of energized resistors changes from pulse to pulse as a function of the printable data. As the subsets vary, resulting in a varying load on the energy source, this causes undesirable variations in the energy supplied to individual resistors, even when a regulated source is used, because of residual impedances in the source and wiring. The invention compensates for such energy variations, using information about which subset of resistors is to be energized during a pulse. By determining the electrical load presented by the subset, and by referring to a predetermined relation between the load value and the voltage drop in the residual impedances, the invention maintains nominally constant energy in individual pulsed resistors by an appropriate adjustment of the pulse width.

13 Claims, 4 Drawing Sheets

REDUCING ENERGY VARIATIONS IN THERMAL INKJET PRINTERS

CROSS REFERENCE TO RELATED APPLICATION

This is a continuation of application Ser. No. 08/311,372 filed on Sep. 23, 1994, now abandoned.

FIELD OF THE INVENTION

This invention relates to thermal inkjet printing, and, in particular, to minimizing variations of the energy delivered to printhead resistive heaters.

BACKGROUND AND SUMMARY OF THE INVENTION

Thermal inkjet (TIJ) printing involves propelling minute, closely spaced jets of ink onto a printing surface, which is usually paper. A TIJ printhead contains a reservoir of ink connected with a series of nozzles which are used to form the jets. By controlling both the movement of the printhead across the paper and also which jets are activated at any given time, a printer can form alphabetic characters and graphic images.

A typical TIJ printhead is shown in FIG. 4. This is a disposable unit with its ink supply contained within its plastic housing. To form each jet, a tubular nozzle is mounted with its internal end communicating with the ink reservoir and its external end close to the paper. These nozzles are organized into banks or rows 82, two of which may be seen in the end view of the printhead in FIG. 5. A small resistor, of a size comparable to the diameter of the nozzle, is mounted in the ink reservoir close to the internal end of each nozzle. When a pulse of electrical energy is sent to the resistor, its rapid heating boils the adjacent ink, forming a minute bubble. The growth of this bubble forces a small quantity of ink through the nozzle and onto the paper. Electrical pulses are supplied to the printhead via a collection of small conductive areas 80 which mate with corresponding contacts in the printer. The resistors in the printhead may thus be activated in any desired combination.

To maintain good print quality, it is essential that the bubble formation and subsequent ink ejection remain very consistent over a large number of operations. Although there are many variables which affect this process, one of the most important is the amount of energy supplied to the resistor each time it is pulsed; this energy must be constant, or nearly so. Below a certain energy limit, the bubble does not form properly, and above another limit, there is thermal damage to the resistor.

A factor affecting the operation of a TIJ printhead is that not all available resistors in a resistor bank in the printhead are simultaneously energized. Only a subset—its composition dependent on the printable data—from the total set of resistors in the bank is "fired" during a particular pulse. Referring now to FIG. 1, if the energy source supplying the printhead is modeled as a voltage source Vs (12) with a series impedance Zs (14), then the amount of energy supplied to any given resistor 10 will vary with the number of its neighbors which are also energized during that pulse. A typical bank might contain 20 resistors. Thus, from 1 to 20 of these may be pulsed by closing the respective switch(es) 16. This load variation puts stringent demands on the regulation of the energy source.

An excellent reference for information on TIJ printing is the October, 1988 issue of the Hewlett-Packard Journal. This includes additional pictures of printheads and other elements of a TIJ printer, as well as diagrams and technical discussions of numerous design concerns. In particular, the article *Integrating the Printhead into the HP DeskJet Printer*, page 62ff, discusses prior-art attempts to deal with the variable-energy problem solved by this invention. According to the article, the solution chosen was to limit the maximum size of a resistor bank to four. As will be seen by a study of the present disclosure, such a limitation is overcome by the principles of the invention.

To keep the energy constant in a printhead resistor 16 each time it is pulsed, regardless of how many other resistors are also pulsed at the same time, is a problem that calls for an inexpensive and readily implemented solution.

One conventional response to this problem is to provide a regulated power supply with load voltage sensing. But, since pulse width (pulse time duration) in TIJ printing is typically just a few microseconds, this requires an expensive regulator with wide loop bandwidth to track the rapid load variations.

In a less expensive regulated supply, an output capacitor provides low impedance at nigh frequencies. But the series resistance of this capacitor is not negligible; neither is that of the connecting cabling linking the printhead with its driver. These resistances, together with other parasitic resistances, limit the achievable reduction in output impedance.

One embodiment of the present invention addresses the problem of delivering, from a common power supply, pulses of constant energy to a set of resistors which can be individually switched across the supply, as shown in FIG. 1. If subsets of resistors are switched on in a sequence according to some known schedule, such as occurs in TIJ printing, it is not necessary to use a feedback loop, with its attendant speed limitations, to compensate for load variations. The effect of load variations can be compensated instantaneously. The invention uses a practical and inexpensive method for doing this: adjusting the pulse width.

In an embodiment of the invention, all the resistors are nominally equal in value. The total conductance of the switched-on subset is determined by multiplying the number of resistors in the subset by the conductance of an individual resistor. The total conductance determines the pulse width through use of a compensation relation formula or lookup table.

Different compensation relations may be used to determine the pulse width variation. The simplest is to vary the pulse width linearly with the load conductance. However, the energy absorbed by a pulsed resistor varies (a) as the square of the voltage across it, and (b) linearly with the pulse width. But, because of the source impedance, the load voltage varies approximately inversely with the load conductance. Hence, more accurate energy compensation can be obtained by varying the pulse width in square-law relation to the conductance. Furthermore, precise compensation can be obtained by determining exactly how the load voltage varies with load conductance and varying the pulse width inversely with the square of the load voltage. These or other relations may be employed in the invention.

When a microprocessor or other digital hardware is used to implement the principles of the invention, it is convenient to use a compensation relation that varies the pulse width in discrete steps. The resolution of the pulse width adjustment, and hence the accuracy of the compensation, is improved for high controller clock rates and correspondingly smaller clock periods.

In another embodiment of the invention, the set of resistors contains resistors of different values. The conductances of all the resistors in the set are stored in a lookup table. When a particular subset is chosen to be the load, the conductance values of all the subset members are retrieved from the table and added. The pulse width is then determined from the sum value by a compensation relation.

DETAILED DESCRIPTION

Figure 1:
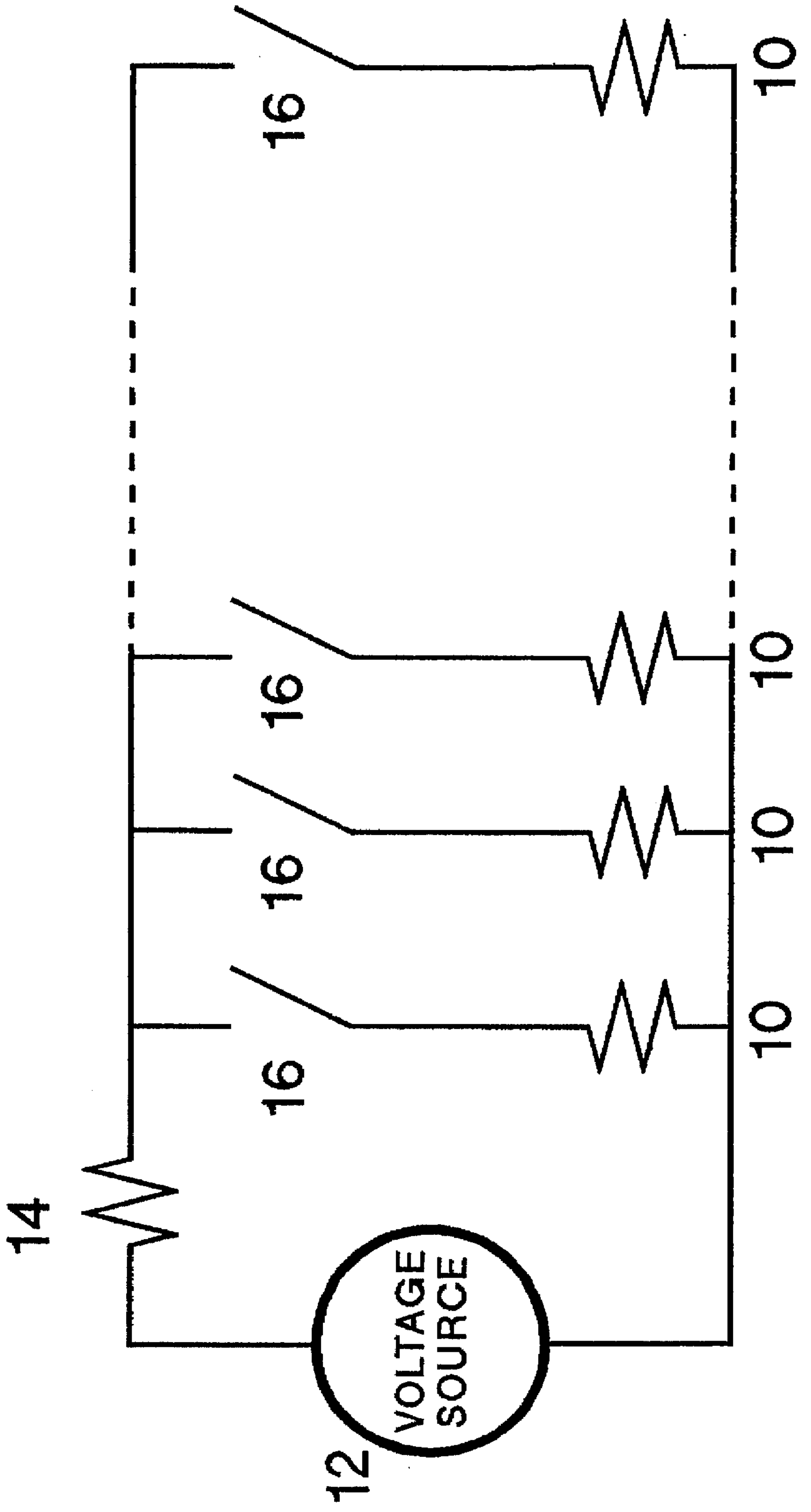
Fig. 1 (prior art)
FIG. 1 is a simplified TIJ printing arrangement, showing an energy source supplying individually switched printhead resistors.
Figure 2:
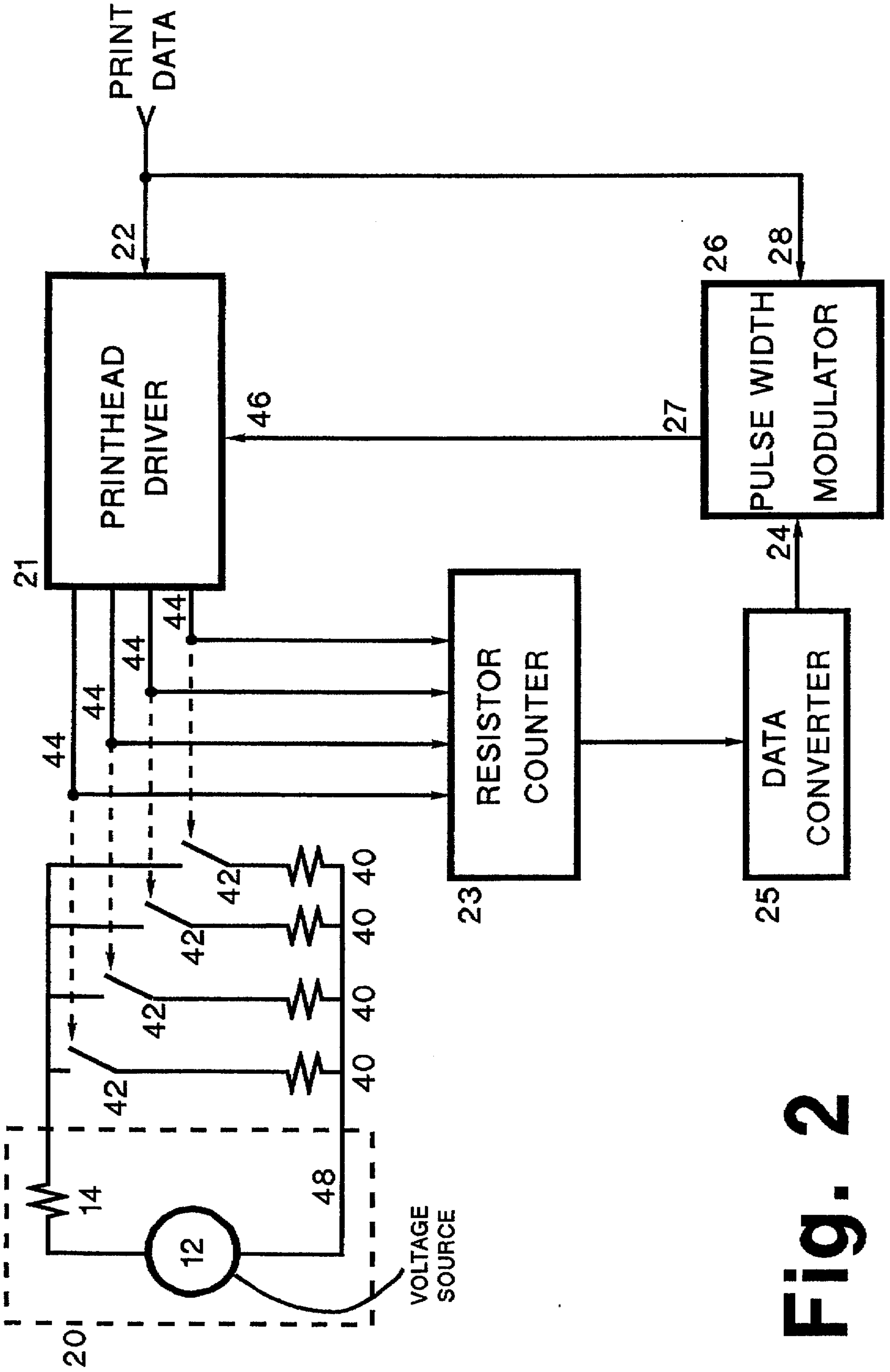
FIG. 2 is a diagram of an apparatus according to a preferred embodiment of the invention.

Refer now to FIG. 2, which shows a preferred embodiment of the invention. An energy source 20 is modelled as a voltage source Vs (12) with a known series impedance Zs (14). In this embodiment, the source is a regulated DC power supply of about 12 volts output, whose output impedance (at high frequencies; see previous discussion) is determined by the series resistance of a filter capacitor, about half an ohm. To this resistance is added that of a flexible cable used to connect to the moving printhead, plus other connectors.

Connected to the source 20 is a set of nominally equal-valued printhead resistors 40, each having a switch 42 by which it can be connected across the source 20. These resistors share a common return path 48, so that those which are switched across the source are in parallel. The nominal value of the resistors is thirty ohms. The distribution of production values is Gaussian, but the distribution tails are truncated, as printheads with resistor values beyond about ±10% of the nominal are rejected.

In TIJ printing, each resistor is submerged in an ink reservoir. When a resistor is energized by pulsing its switch, it boils the ink in contact with it, forming a minute bubble whose expansion forces liquid ink through an adjacent nozzle and onto a print medium such as paper. In the printhead, the resistors and nozzles are arranged in sets of columns called "primitives". Although 10 to 25 resistors would commonly comprise one primitive, only four resistors are shown in FIG. 2 for drawing simplicity. The principles of the invention remain the same for any number of resistors. Switches 42 are activated by control signals connected via lines 44. Control output lines 44 are energized by printhead driver circuit 21, whose input 22 is the data to be printed. Printhead driver circuit 21 determines, from the print data, just which subset of resistors is to be energized during a pulse. Depending on this print data, from 0 to 4 resistors may be chosen, in various combinations. Driver 21 also has an enable input 46 to govern when lines 44 may be activated.

Also connected to control lines 40 is the resistor counter 23. Its circuitry determines the number of resistors being energized during a pulse. This number is supplied as an input to data converter 25, which uses a compensation relation formula to determine a corresponding pulse width. Data converter can compute the pulse width, or the proper pulse width for each possible number of energized resistors can be pre-computed, stored in a lookup table, and retrieved as needed. The latter method is often faster when the compensation relation is complex.

Pulse width modulator (PWM) 26 generates a timing signal on its output 27. This timing signal is initiated by the print data on start input 28, and its width corresponds to the information supplied by data converter 25 to width control input 24. The timing signal is supplied as the enable signal to printhead driver circuit 21 to regulate the width that the selected switches are closed.

A typical print cycle begins with the arrival of print data to 30 input 22 of printhead driver 21 and to width control input 28 of PWM 26. This event initiates a timing signal on output 27 of PWM 26. At the same time, printhead driver 21 chooses the proper subset of resistors, and the timing signal enables the corresponding control lines 44 to close their switches, thus supplying energy to the subset. Resistor counter 23, by monitoring the control lines 44, determines the number of activated resistors, and supplies this number to data converter 25. Data converter 25, according to its internal rule or algorithm (explained below) determines an appropriate timing signal duration and supplies this information to PWM 26 at its width control input 24. Data converter 25 can use table lookup means or computation to implement its internal algorithm. When the determined time duration is reached, PWM 26 terminates the timing signal, causing the switches to open.

The function of data converter 25 is cooperating to counteract the variation in the pulsed energy supplied to a resistor, depending on whether it is selected alone, or has 1, 2, or 3 other resistors selected with it. As more resistors are switched on, the voltage across each one is reduced because of the increased voltage drop across Zs (14), which subtracts from the available voltage Vs (12). This reduces the power supplied to a resistor; the energy supplied is also reduced, since this is simply power times the pulse width. Data converter 25 operates to extend the pulse width as more resistors are selected. There are various choices of how to vary the pulse width as a function of the number of resistors selected. To make this choice, it is helpful to understand the energy variation in more detail.

If a single resistor is selected, the energy it dissipates during the pulse (assuming that impedance Zs is resistive) is $$\left[\frac{Vs}{Zs+R}\right]^2 \cdot RT \tag{1}$$

where R is the common resistor value

T is the pulse width.

In general, for M resistors connected across the source, the energy dissipated in each resistor is $$\left[\frac{Vs}{MZs+R}\right]^2 \cdot RT \tag{2}$$

Equation (2) is exact. By re-arranging and expanding this expression, another form is obtained which shows clearly the dependency of the energy on the number M of load resistors; the energy dissipated in each resistor is $$\frac{Vs^2T}{R}\,(1-2Ma+3M^2a^2-\ldots) \tag{3}$$

where M=1, 2, 3, . . . .

a =Zs/R

Expression (3), just as the exact Equation (2), describes the reduction of energy in a resistor as more resistors are added. However, it also suggests that there is a choice of algorithms that can be installed in data converter 25 for increasing pulse width T to compensate for this reduction.

By increasing T inversely as the first 2 terms in the parentheses, a linear correction of the energy reduction may be obtained. This is the simplest algorithm to implement and may be adequate in many applications, especially if a=Zs/R is much less than unity. By adding the third term, a square-law correction is obtained, which is probably satisfactory for most applications. But, if exact correction is needed, it can be obtained by embodying Equation (2) in data converter 25.

In the described preferred embodiment, a linear compensation rule proves to be adequate for the desired print quality, and data converter 25 is a lookup table with precomputed output values corresponding to all possible subset sizes.

In TIJ printer applications, it is common to implement all or most control functions with digital hardware and/or a microprocessor. Such is the case in this embodiment. In this case, PWM 26 adjusts the pulse width in discrete steps. In the implementation of the PWM, data converter 25 presets a counter. This counter, advanced by the system clock, terminates the pulse when it reaches its end count. The accuracy of this approach is quite adequate, with the clock allowing a time resolution of about 50 nanoseconds out of a pulse width of several microseconds.

Figure 3:
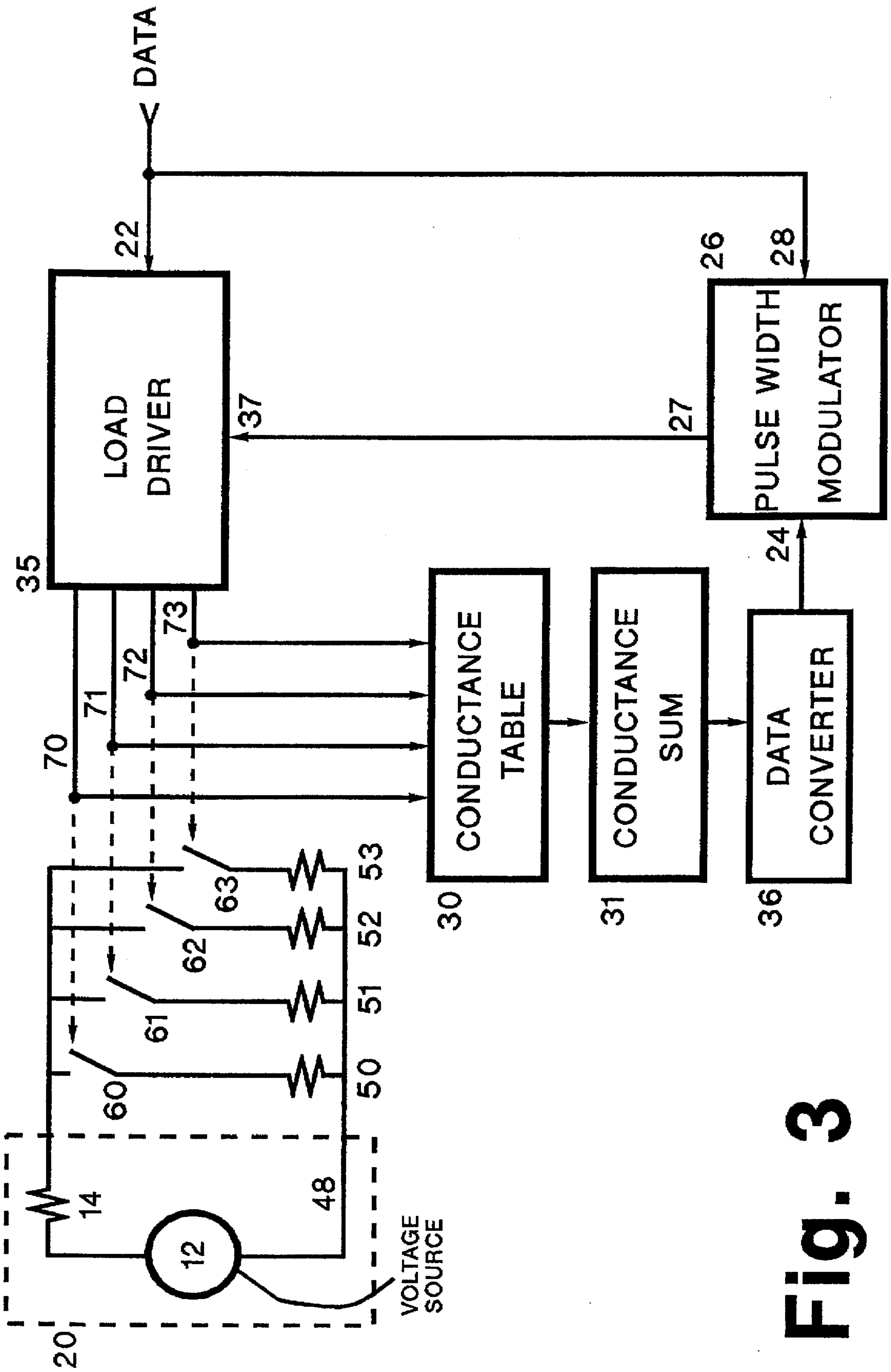
FIG. 3 is a diagram of an apparatus according to another embodiment of the invention having resistors of differing values.
Figure 4:
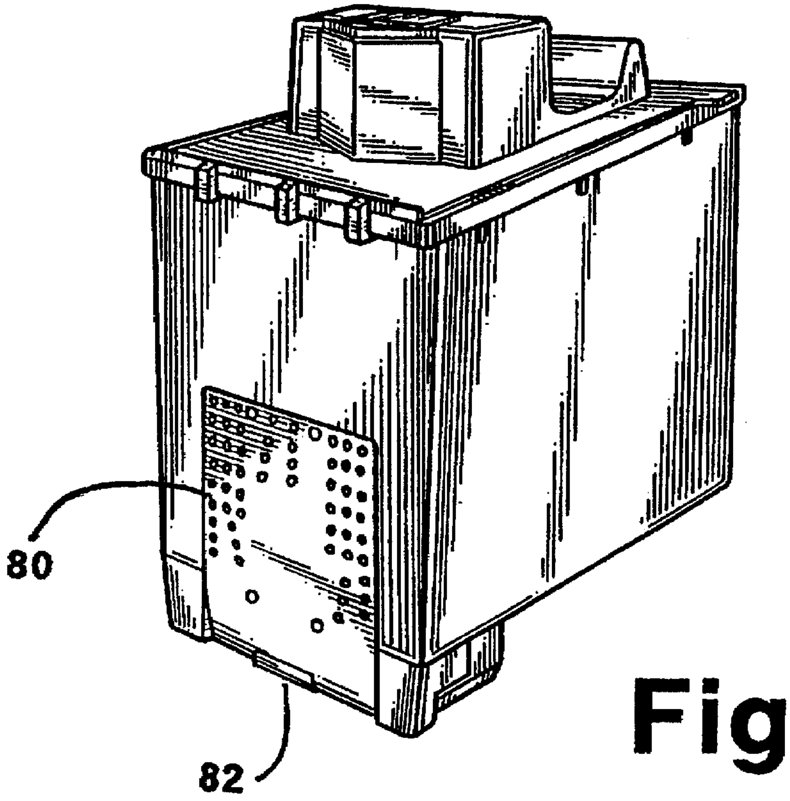
Fig. 4 (Prior art)
FIG. 4 is an isometric view of a replaceable TIJ printhead.
Figure 5:
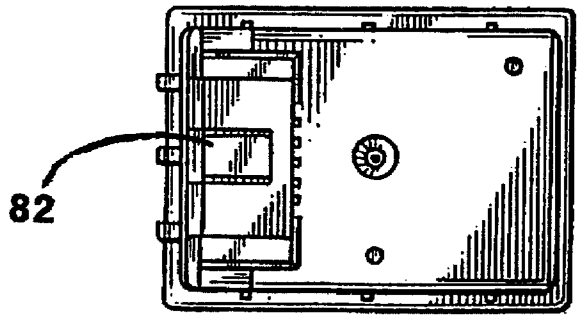
Fig. 5 (Prior art)
FIG. 5 is an end view of the printhead of FIG. 4.

In another embodiment of the invention, the load resistors have different values. Referring to FIG. 3, load resistors 50–53 are now presumed to differ in value. Although the problem is similar to that already discussed for the case of nominally equal values of resistance, what is required here is more than knowing the number of resistors selected during a pulse cycle. Their individual values must also be known in order to compute the total load on the source, and, therefore, the voltage drop in Zs.

In this embodiment, a conductance table 30 stores the values of conductance for each resistor in the set. When load driver 35 chooses a subset based on data at its input 22, control lines 70–73 inform table 30 which resistors comprise the subset. The conductance value of each member of the subset is looked up in table 30 and this data is passed to a data combiner (here called a conductance sum block 31), which adds the values to determine the total load (as a conductance) on the source.

Values of conductance, rather than resistance, are stored because of the ease of calculating the total load by a simple summing operation. Alternatively, values of resistance can be stored, but calculating the total load resistance is more complicated. The term "data combiner" refers to the operation of summing conductances, or the invert-sum-invert operation needed if values of resistance are stored.

The sum value is passed to data converter 36, which, in the same manner as in the previous embodiment, determines the increase in pulse width needed to maintain the pulsed energy constant, or nearly so. When there are many load resistors (more than the four used here for illustrative simplicity), it is likely that data converter 36 will compute the required pulse width, rather than rely on a precomputed lookup table. This is because the number of possible values of total load conductance (or resistance) grows rapidly with the size of the resistor set.

In similar fashion to the preferred embodiment already described, PWM 26 furnishes, via output 27, a variable-duration timing signal to enable input 37 of the load driver. PWM 26 receives start and pulse width information through its inputs 28 and 24, respectively.

We have described and illustrated the principles of our invention with reference to a preferred embodiment and an additional embodiment; however, it will be apparent that the invention can be modified in arrangement and detail without departing from such principles. For instance, the energy source can be modelled as a current source with a parallel impedance. It will be recognized that the detailed embodiment is illustrative only, and should not be taken as limiting the scope of our invention. Rather, we claim as our invention all such variations as may fall within the scope and spirit of the following claims and equivalents thereto.

What is claimed is:

1. A method for driving a subset of resistors in apparatus comprising an energy source of known impedance and a set of resistors sharing a common return path, each resistor having a switch for connecting to the energy source, wherein the subset of resistors receives an energy pulse by simultaneous action of the corresponding switches, the method comprising the steps of:

storing, in a lookup table, the value of conductance of each resistor in the set;

retrieving, from the lookup table, the value of the conductance of each resistor in the subset;

adding the retrieved values to form a sum of conductances;

selecting the width of the pulse according to the sum of conductances and the source impedance.

2. In apparatus comprising a voltage source having a known series resistance, and a set of load conductances, wherein each conductance is associated with a switch for connecting to the voltage source, and a subset of conductances receives energy pulses by simultaneous pulsed operation of switches associated with the subset, a method for maintaining nominally constant energy in an individual pulsed conductance, the method comprising the steps of:

a) determining a compensation relation between the total load on the voltage source and switching pulsewidth required to maintain nominally constant energy in a pulsed load conductance;

b) storing, in a lookup table, the value of each conductance in the set;

c) retrieving, from the lookup table, the value of each conductance in the subset;

d) adding the retrieved conductance values to form a sum;

e) determining a value of switching pulsewidth, corresponding to the conductance sum, for maintaining nominally constant energy in a pulsed load conductance;

f) setting the switching pulsewidth to the value determined in step (e).

3. A method for maintaining nominally constant energy, as recited in claim 2, in which, in step (e), determining the switching pulsewidth is carried out through consulting the compensation relation of step (a).

4. A method for maintaining nominally constant energy, as recited in claim 3, in which the consulting step comprises algorithmically evaluating the compensation relation.

5. A method for maintaining nominally constant energy, as recited in claim 4, in which, in step (e), determining the switching pulsewidth is carried out through consulting a linear approximation to the compensation relation of step (a).

6. A method for maintaining nominally constant energy, as recited in claim 5, in which the linear approximation is quantified.

7. A method for maintaining nominally constant energy, as recited in claim 6, in which quantified values of the linear approximation are stored in a lookup table, and the consulting step comprises retrieving values from this table.

8. A method for maintaining nominally constant energy, as recited in claim 2, in which, in step (e), determining the switching pulsewidth is carried out through consulting a square-law approximation to the compensation relation of step (a).

9. A method for maintaining nominally constant energy, as recited in claim 8, in which the square-law approximation is quantified.

10. A method for maintaining nominally constant energy, as recited in claim 6, in which quantified values of the square-law approximation are stored in a lookup table, and the consulting step comprises retrieving values from this table.

11. In apparatus comprising a voltage source, having a known source resistance, and a set of load resistances, wherein each load resistance is associated with a switch for connecting to the voltage source, and a subset of load resistances receives energy pulses by simultaneous pulsed operation of switches associated with the subset, a method for maintaining nominally constant energy in a pulsed load resistance, the method comprising the steps of:

a) determining a compensation relation between the total load on the voltage source and switching pulsewidth required to maintain nominally constant energy in a pulsed load resistance;

b) storing, in a lookup table, the value of each load resistance in the set;

c) retrieving, from the lookup table, the value of each load resistance in the subset;

d) combining the retrieved resistance values to form an combined load resistance;

e) consulting the compensation relation to determine a value of switching pulsewidth corresponding to the combined load resistance;

f) setting the switching pulsewidth to the value determined in step (e).

12. A pulsed electrical circuit comprising:

a) a voltage source having a known series resistance and an output;

b) a set of load conductances sharing a common return line, each conductance having an associated switch coupled to the voltage source output;

c) a lookup table relating each load conductance to its numerical value;

d) a selection circuit, having outputs coupled to the switches for selectively enabling the energizing of a predetermined subset of the load conductances e) a pulsing circuit, having a control input, and an output coupled to the selection circuit for simultaneously pulsing the switches associated with the subset;

f) means for retrieving, from the lookup table, values of conductance of members of the subset, and for adding these values to form a sum output representing the total load on the voltage source; and g) a compensator circuit, coupled to the sum output, to determine, from a stored relationship including the source resistance and the total load, a pulsewidth value, and a control output coupling this value to the pulsing circuit input.

13. A pulsing circuit, as recited in claim 12, wherein the stored relationship includes pulsewidth values which maintain nominally constant energy in any pulsed conductance.

* * * * *